United States Patent [19]

Oshida et al.

[11] Patent Number: 5,056,649
[45] Date of Patent: Oct. 15, 1991

[54] MECHANISM FOR INVERTING CARRIER

[75] Inventors: Mamoru Oshida, Funabashi; Masaru Oizumi, Tokyo; Yoshiyuki Ichizawa, Soka, all of Japan

[73] Assignee: Yoshino Kogyosho Co., Ltd., Tokyo, Japan

[21] Appl. No.: 655,280

[22] Filed: Feb. 14, 1991

Related U.S. Application Data

[63] Continuation of Ser. No. 478,428, Feb. 12, 1990, abandoned.

[30] Foreign Application Priority Data

Apr. 11, 1990 [JP] Japan .................................. 1-34078

[51] Int. Cl.⁵ .............................................. B65G 47/40
[52] U.S. Cl. ...................................... 198/706; 198/703
[58] Field of Search ............... 198/703, 705, 706, 710, 198/476.1, 477.1

[56] References Cited

U.S. PATENT DOCUMENTS

| | | | |
|---|---|---|---|
| 714,149 | 11/1902 | Clarke | 198/706 |
| 730,541 | 6/1903 | Joor | 198/703 X |
| 748,576 | 1/1904 | Bivert | 198/703 X |
| 1,498,198 | 6/1924 | Philips | 198/706 |
| 2,426,304 | 8/1947 | Hapman | 198/703 X |
| 4,750,606 | 6/1988 | Gough | 198/706 |
| 4,892,179 | 1/1990 | Lassiter, Jr. et al. | 198/706 X |

FOREIGN PATENT DOCUMENTS

| | | |
|---|---|---|
| 0212858 | 3/1987 | European Pat. Off. . |
| 145551 | 12/1902 | Fed. Rep. of Germany . |
| 1116156 | 4/1962 | Fed. Rep. of Germany . |
| 3834947 | 8/1989 | Fed. Rep. of Germany ...... 198/706 |
| 549170 | 3/1922 | France . |
| 0216806 | 12/1983 | Japan ................... 198/706 |
| 0870540 | 6/1961 | United Kingdom ................ 198/703 |

Primary Examiner—Robert P. Olszewski
Assistant Examiner—James R. Bidwell
Attorney, Agent, or Firm—Oliff & Berridge

[57] ABSTRACT

An inverting mechanism according to the present invention comprises an inverting body for inverting which includes a plate member fixed to each of a plurality of carriers connected to an endless chain and four inverting elements rotatably supported on each plate member at circumferential positions spaced equidistant from each other, and an inverting cam provided on a rack rail on which the inverting elements roll. The inverting element on the body traveling on the rail drops into a groove formed in the inverting cam to rotate the body about the dropped inverting element as another inverting element rolls along a projection on the reversing cam to downwardly direct the top opening of the carrier and thereby an article to be transferred can be taken out of the carrier.

2 Claims, 2 Drawing Sheets

_5,056,649_

MECHANISM FOR INVERTING CARRIER

This is a continuation of application Ser. No. 07/478,428 filed Feb. 12, 1990 now abandoned.

BACKGROUND OF THE INVENTION

1. FIELD OF THE INVENTION

The present invention relates to a mechanism for taking an article to be transferred out of a barrel shaped carrier, having a bottom, such as a bucket or the like, by inverting the carrier to automatically drop the article out of the inverted carrier by its own weight.

2. STATEMENT OF RELATED ART

Hitherto, as a means for taking an article out of a carrier in a conveyance apparatus comprising a plurality of barrel shaped carriers for receiving articles to be transferred, each of which having a bottom, such as a bucket or the like, and one or two endless chains connected to the carriers and arranged so as to travel along a loop track, it is known that the endless chain may be arranged so that the carriers connected to the chain travel along a loop track in a vertical plane to provide an upper portion in which the carriers progress in a normal posture and a lower portion in which the carriers return in an inverted posture to thereby let the articles in the carriers drop out of the carriers by their own weight at the lower portion of the endless chain.

Moreover, there are other well known arrangements for taking the article out of the carrier by use of an additional grasping device.

However, the conventional arrangements for dropping the article out of the carrier, so connected, is limited to the case where the carriers and articles travel along the loop track in the vertical plane and can not apply to a case of traveling in a horizontal plane.

Furthermore, the arrangement for taking the article out by use of the additional grasping device requires high cost of equipment and is expensive.

SUMMARY OF THE INVENTION

It is an object of the present invention to eliminate the aforementioned disadvantages and to provide an inverting mechanism adapted for easily and economically taking an article out of the carrier irrespective of whether the endless chain, the carriers and the articles travel along a loop track in a horizontal or vertical plane.

According to the present invention, a mechanism for inverting a carrier comprises a body 1 to be inverted and an inverting cam 2.

The body 1 includes a plate member 3 fixed to a carrier 8, such as a bucket, connected to an endless chain, and four inverting elements 4 which are rotatably supported on a plate member 3 at circumferential positions spaced equidistant from each other.

The inverting cam 2 includes a projection 5 formed on a track rail 9 on which the inverting elements 4 of body 1 roll to guide the inverting elements 4 so as to invert the body 1, and grooves 6 formed in the track rail at the front and rear sides of projection 5.

The function of the present invention will be now described by reference to FIG. 2 of the accompanying drawings.

First, at "A" position, body 1 travels with two inverting elements 4 (a third inverting element 4-3 and a fourth inverting element 4-4) rolling on rail 9. At this time, the bucket or carrier 8 fixed with body is maintained in the normal posture with the top opening being upwardly directed and an article 13 to be transferred being contained in carrier 8. The top opening of the carrier is shown by a straight line connecting two inverting elements 4 in FIG. 2: for example, at "A" position, the straight line connected the first inverting element 4-1 and the second inverting element 4-2.

When body 1 reaches "B" position as the carrier maintains the normal posture, the fourth inverting element 4-4 drops in groove 6 to abut against projection 5 ("C" position). As carrier 8 progresses further, body 1 begins to rotate counterclockwise about the fourth inverting element 4-4 until the first inverting element 4-1 abuts against projection 5.

After the first inverting element 4-1 abuts against projection 5, carrier 8 progresses further and then the fourth inverting element 4-4 rises out of groove 6 and travels along projection 5. At this time, the first inverting element 4-1 also travels along projection 5 as body 1 continues its inverting movement. When the first inverting element 4-1 drops in groove 6, body 1 begins to rotate about the first inverting element 4-1 in the counterclockwise direction ("D" position). This inverting movement continues until the second inverting element 4-2 contacts the surface of rail 9, and after the second inverting element contacts the surface of rail 9, body 1 progresses as the first inverting element 4-1 and the second inverting element 4-2 roll on rail 9 ("E" position). At this time, the posture of body 1 is in an inverted posture rotated from the original posture of body 1 ("A" position), and therefore, the posture of carrier 8 is also inverted and the top opening of the carrier is directed downward.

Consequently, article 13 drops out of carrier 8 by its own weight and is taken out of carrier 8.

A further inverting cam may be provided on rail 9 to reinvert inverted body 1, thereby returning inverted carrier 8 to the normal posture.

The present invention will be hereinafter described in more detail with reference to an embodiment in the accompanying drawings.

PREFERRED EMBODIMENT OF THE INVENTION

Figure 1:
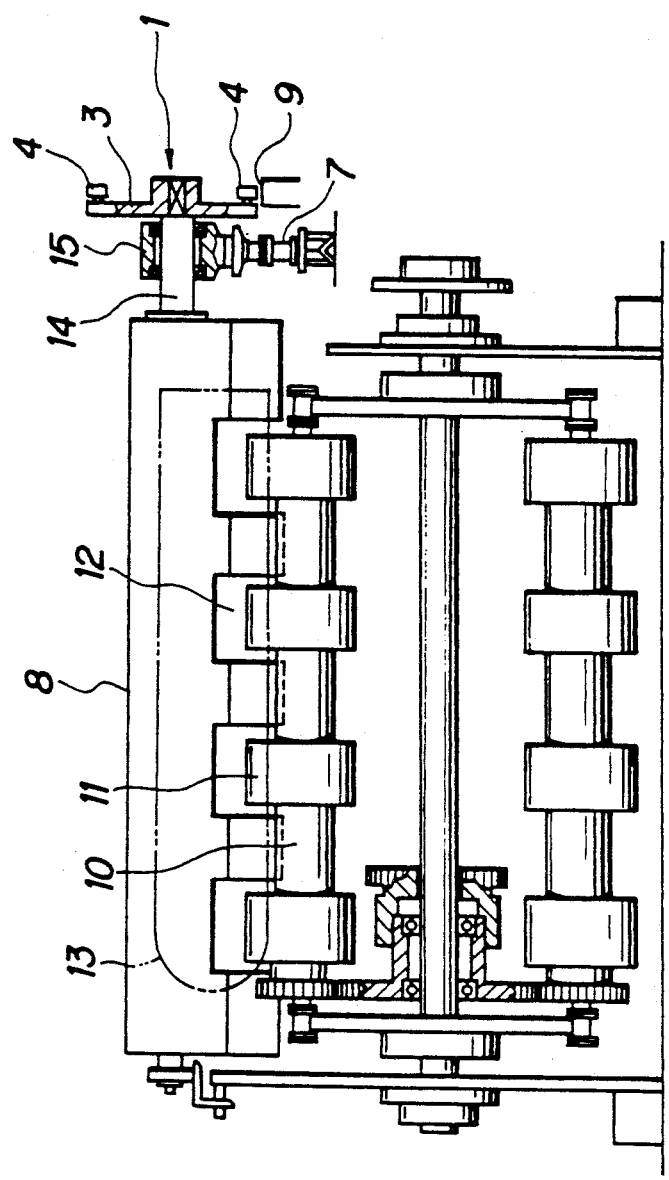
FIG. 1 shows a schematic elevational view of an embodiment of the present invention.
Figure 2:
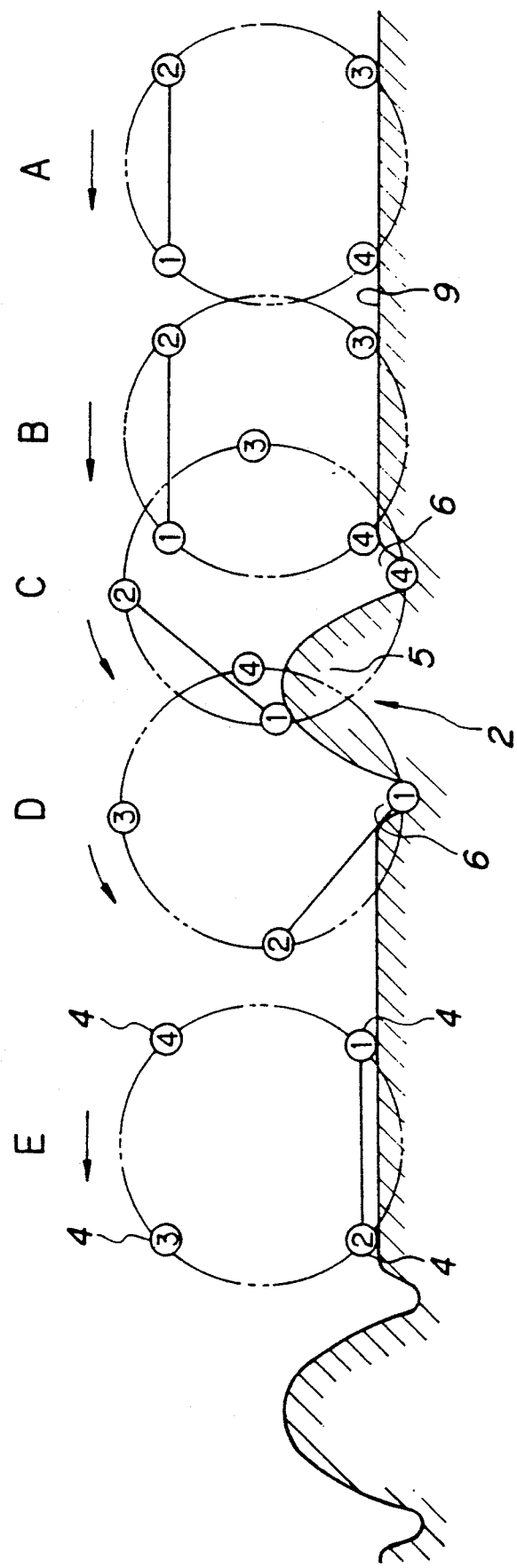
FIG. 2 is a diagrammatic view illustrating the motion of the reversal body.

FIGS. 1 and 2 illustrate an embodiment of the present invention. Particular, FIG. 1 illustrates a portion of an electron beam irradiating conveyance apparatus for irradiating an article to be transferred such as a preform of a container of synthetic resin with an electron beam to remove monomer which adversely affects a content in the container.

The conveyance apparatus comprises a plurality of carriers 8 such as buckets which are spaced equidistant from each other and connected to an endless chain 7 which travels along a loop track in a horizontal plane, a plurality of rollers 10 which are arranged directly under the carriers each having a plurality of lands 11 which intrude into carrier 8 through bottom openings 12 to drivingly contact the article to be transferred so that the rollers rotate the article in the carrier as the rollers are rotated and moved along at the same speed and in the same direction as are the carriers 8, and an electron beam accelerator in an electron beam irradiation area arranged directly above the carriers 8 which are cooperated with the rollers which carriers 8 and rollers are arranged to pass under the electron beam accelerator. Thus, the articles to be transferred are uniformly irradiated with the electron beam as the articles are transferred by means of carriers 8 and rotated by means of the rollers 10. The mechanism according to the present invention is applicable to an irradiating conveyance apparatus described in the copending Patent Application entitled "Irradiating conveyance Apparatus" filed on the same date by the same Applicant (now assigned U.S. Ser. No. 07/478,464 filed Feb. 12, 1990). However, the present invention is not limited to such an application for the conveyance apparatus.

The mechanism according to the present invention comprises a body 1 used for inverting which is fixed to an outer end of a fixed shaft 14 extended from one end of the carrier 8. The fixed shaft 14 is rotatably supported by means of a bearing 15. The apparatus also comprises two inverting cams 2 as the essential component. These inverting cams 2 may be sequentially provided on a track rail 9 at the down flow side of the electron beam irradiation area.

Accordingly, in this preferred embodiment, first the preforms are received in and transferred by carrier 8 in the normal posture. After passing the electron beam irradiation area, carrier 8 is inverted by the first inverting cam 2 to drop the preform by its own weight out of carrier 8. Then the inverted carrier 8 is reinverted by the second inverting cam to return carrier 8 to the original normal posture for receiving a new preform. The aforementioned process is repeated.

In this embodiment, the inverting cam 2 is formed on rail 9 position under body 1 (under the third and fourth inverting elements at "A" position in FIG. 2); however, the inverting cam 2 may also be formed on a rail positioned above body 1 (above the first and second inverting elements at "A" position in FIG. 2). In such a case, projections 5 protrude downwardly from the surface of rail 9.

According to the present invention, the article in the carrier can be easily taken out by simply fixing the body to the carrier and providing an inverting cam on the rail on which the inverting elements on the body roll so as to invert the carrier to an inverted posture, and therefore the article can be easily taken out of the carrier which travels along a loop track in the horizontal plane.

Furthermore, any special device for taking the article out of the carrier is not required and therefore the present invention has various advantages that the construction is simple and economical.

What is claimed is:

1. A mechanism for inverting a carrier in which a plurality of carriers are connected to an endless chain and transferred along a loop track, said mechanism comprising:

a body for inverting which includes a plate member fixed to each carrier and at least four inverting elements rotatably supported on the plate member at circumferential positions spaced equidistant from each other: and at least one inverting cam including at least one projection formed on a track rail on which the inverting elements of the body roll to guide the inverting elements so as to invert the body and grooves formed in the track at the front and rear sides of the projection.

2. The mechanism according to claim 1, wherein the track rail is provided with at least two inverting cams.

* * * * *